(No Model.)
R. TEMMEL.
ELASTIC TIRE.
No. 566,354.　　　　　　　　Patented Aug. 25, 1896.
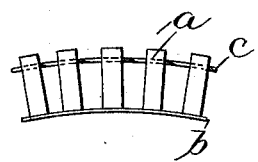
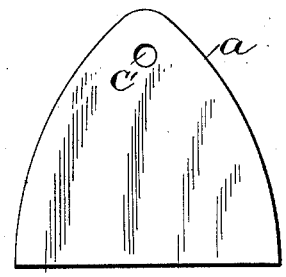
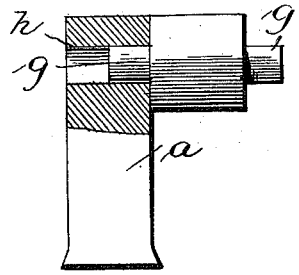
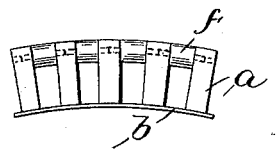
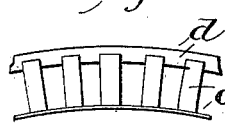
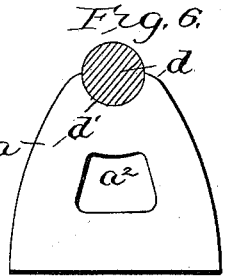
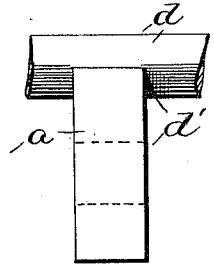
Attest
Miller Donaldson
F. L. Middleton
Inventor
Richard Temmel
by Richards & Co
Attys.

UNITED STATES PATENT OFFICE.

RICHARD TEMMEL, OF BERLIN, GERMANY.

ELASTIC TIRE.

SPECIFICATION forming part of Letters Patent No. 566,354, dated August 25, 1896.

Application filed June 25, 1895. Serial No. 554,020. (No model.)

*To all whom it may concern:*

Be it known that I, RICHARD TEMMEL, a subject of the German Emperor, residing at Berlin, in the German Empire, have invented certain new and useful Improvements in Elastic Tires, of which the following is a specification.

My invention comprises a tire having projecting teeth and a connection between the outer ends of the teeth, said teeth having sockets at their outer ends to receive the connections which extend between the teeth and are independent thereof.

In the drawings, Figure 1 is a side view of one form of my invention; Fig. 2, a detail front view of a tooth; Fig. 3, a side view of a modification in which the connections between the teeth are independent and formed in sections. Fig. 4 is a detail view of Fig. 3, partly in section. Fig. 5 is a side view of another form in which a continuous connection is used between the teeth. Fig. 6 is a front view of the tooth of Fig. 5. Fig. 7 is an enlarged side view of the tooth of Fig. 6.

The teeth $a$ are to be attached to the felly $b$ in any suitable manner. They project radially therefrom, and, as shown in Figs. 1 and 2, they have openings at their outer ends, (marked $c'$,) these forming sockets to receive the band or connecting-ring $c$, which extends continuously about the wheel and connects the teeth together.

In Figs. 3 and 4 the teeth have sockets or openings $h$, similar to the openings $c'$ described, and these receive projections $g$ from blocks $f$, which extend between the teeth, with their outer surfaces flush with the ends of the teeth, thus forming with said teeth the continuous tread portion of the tire.

In Figs. 5, 6, and 7 a continuous band or ring $d$ connects the teeth, and instead of passing through the teeth, which, as in the former instances, have holes forming the sockets, this band simply rests in depressions $d'$ in the ends of the teeth which form the sockets, and in this form the band projects beyond the ends of the teeth, forming a continuous tread independent of the ends of the teeth. In order to lighten the teeth and make them resilient and flexible, they may have openings $a^2$ formed through their body portions.

I claim—

1. A tire comprising a series of projecting teeth and a connection between the outer ends of the teeth, the said teeth having sockets formed at their outer ends to receive the connections which are independent of the teeth, substantially as described.

2. A tire comprising a series of projecting teeth and a ring or connection between the outer ends thereof, said ring or connection serving as the tread portion, the said teeth having sockets formed at their outer ends to receive the connections which are independent of the teeth, substantially as described.

In witness whereof I have hereunto set my hand in presence of two witnesses.

RICHARD TEMMEL.

Witnesses:
WM. HAUPT,
CHAS. KRUGER.